(12) United States Patent
Blanding et al.

(10) Patent No.: US 7,730,388 B2
(45) Date of Patent: Jun. 1, 2010

(54) CONVERTING AN ENHANCED METAFILE INTO A CHRONOLOGICALLY INDEPENDENT OBJECT PROPERTY LIST FOR CONVERSION INTO A PDF DOCUMENT

(75) Inventors: Stephen M. Blanding, Redmond, WA (US); Zhenjun Zhu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1075 days.

(21) Appl. No.: 11/266,422

(22) Filed: Nov. 3, 2005

(65) Prior Publication Data

US 2007/0097401 A1 May 3, 2007

(51) Int. Cl.
*G06F 17/27* (2006.01)
(52) U.S. Cl. .............................. 715/200; 715/204
(58) Field of Classification Search ............... 358/1.13, 358/1.15, 300; 707/100, 101, 102; 715/200, 715/201, 204, 239
See application file for complete search history.

(56) References Cited

U.S. PATENT DOCUMENTS

2001/0032217 A1* 10/2001 Huang ..................... 707/513
2002/0111924 A1*  8/2002 Lewis ..................... 705/413
2002/0154127 A1* 10/2002 Vienneau et al. ......... 345/473

* cited by examiner

*Primary Examiner*—Edward L Coles
*Assistant Examiner*—Eric A Rust
(74) *Attorney, Agent, or Firm*—Merchant & Gould; Ryan T. Grace (57) ABSTRACT

An electronic paper file is generated from an enhanced metafile such that data may be converted from multiple applications with different data descriptions to a single electronic paper format having a particular data description. The enhanced metafile includes a series of individual records that provide a sequence of graphic instructions to render properties associated with objects in the document in an output format. The enhanced metafile is parsed into a series of state independent objects to generate an intermediary representation of the document. The objects and corresponding identifying information are temporarily stored in an object storage structure before using the objects to generate the electronic paper file. The object storage structure provides a stateless model of the enhanced metafile such that the objects may be randomly accessed and applied to any output format.

14 Claims, 6 Drawing Sheets

| 400 IDENTIFIER | 410 VALUE | 420 TYPE |
| --- | --- | --- |
| DrawPath | A PATH CONTAINS A SET OF POINTS | Path |
| LineColor | #FF000000 | Color in ARGB |
| PenSize | 1 | Integer |
| LineStyle | 1 for solid line | Integer |
| ClipPath | NULL | Path |
| TransForm | [1 0 0 1 0 0] | Matrix |

CONVERTING AN ENHANCED METAFILE INTO A CHRONOLOGICALLY INDEPENDENT OBJECT PROPERTY LIST FOR CONVERSION INTO A PDF DOCUMENT

BACKGROUND

An enhanced metafile is a temporary file created by an operating system before data associated with a graphic is output (e.g., to a printer, display, or file). The enhanced metafile includes a sequential list of records. Each record includes an instruction for drawing the graphic. To recreate the graphic, a graphic engine reads the records in the enhanced metafile one at a time. The graphic engine duplicates the recorded instructions by calling different functions to recreate the graphic. The enhanced metafile is state dependent on the sequence of the records. Each individual instruction in a record is meaningless when taken out of context of the sequence established by the enhanced metafile.

SUMMARY

An electronic paper file is generated from an enhanced metafile such that data may be converted from multiple applications with different data descriptions to a single electronic paper format having a particular data description. The enhanced metafile is generated when a user executes a command to publish a document to an electronic paper format. The enhanced metafile includes a series of individual records that provide a sequence of graphic instructions to render properties associated with objects in the document in an output format. The enhanced metafile is parsed into a series of objects to generate an intermediary representation of the document. Graphic instructions associated with each object are provided with context such that the objects are state independent.

The objects and corresponding identifying information are temporarily stored in an object storage structure (e.g., an object property list) before using the objects to generate the electronic paper file. The object storage structure provides a stateless model of the enhanced metafile such that document objects may be randomly accessed and applied to any output format. The electronic paper file is generated by accessing the corresponding objects in the object storage structure. Multiple object storage structures may be used to generate the electronic paper file. An object table associated with the object storage structure may index the objects such that objects associated with different object storage structures may be linked together.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Embodiments of the present disclosure now will be described more fully hereinafter with reference to the accompanying drawings, which form a part hereof, and which show, by way of illustration, specific exemplary embodiments for practicing the invention. This disclosure may, however, be embodied in many different forms and should not be construed as limited to the embodiments set forth herein; rather, these embodiments are provided so that this disclosure will be thorough and complete, and will fully convey the scope to those skilled in the art. Among other things, the present disclosure may be embodied as methods or devices. Accordingly, the present disclosure may take the form of an entirely hardware embodiment, an entirely software embodiment or an embodiment combining software and hardware aspects. The following detailed description is, therefore, not to be taken in a limiting sense.

Illustrative Operating Environment

Figure 1:
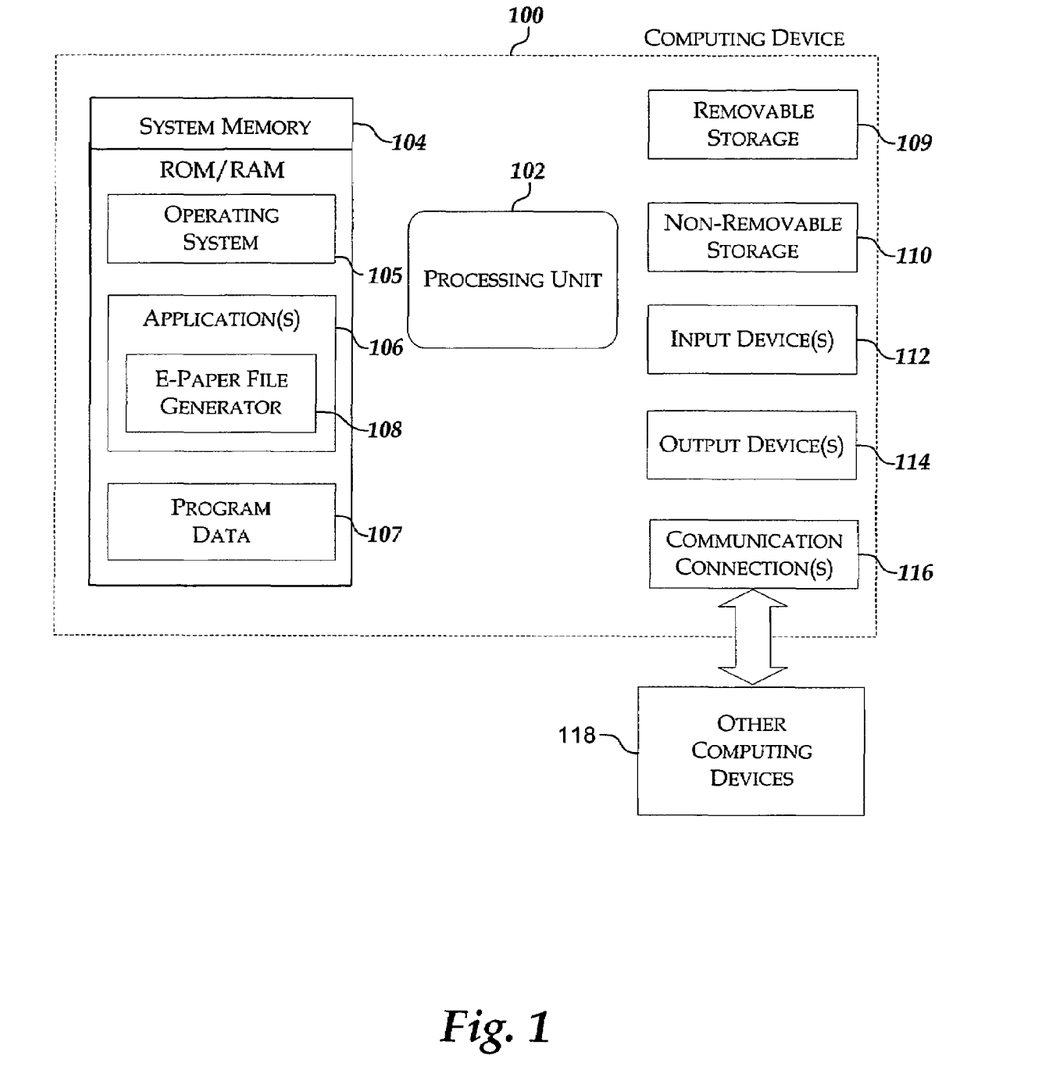
FIG. 1 illustrates a computing device in which an electronic paper file generator application may be implemented.

Referring to FIG. 1, an exemplary system for implementing an electronic paper file generator application includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes operating system 105, one or more applications 106, and may include program data 107. In one embodiment, applications 106 further include electronic paper file generator 108 that is discussed in further detail below.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as a keyboard, mouse, pen, voice input device, touch input device, etc. Output device(s) 114 such as a display, speakers, printer, etc. may also be included. All these devices are known in the art and need not be discussed at length here.

Computing device 100 also contains communication connection(s) 116 that allow the device to communicate with other computing devices 118, such as over a network or a wireless mesh network. Communication connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The present disclosure is not limited to the above-described environment, however. Many other configurations of computing devices, communications, applications, and distribution systems may be employed to implement a multi-dimensional calculation application that uses query scripts to optimize leaf-level calculations.

Electronic Paper File Generator

The present disclosure is described in the general context of computer-executable instructions or components, such as software modules, being executed on a computing device. Generally, software modules include routines, programs, objects, components, data structures, and the like that perform particular tasks or implement particular abstract data types. Although described here in terms of computer-executable instructions or components, the present disclosure may equally be implemented using programmatic mechanisms other than software, such as firmware or special purpose logic circuits.

Figure 2:
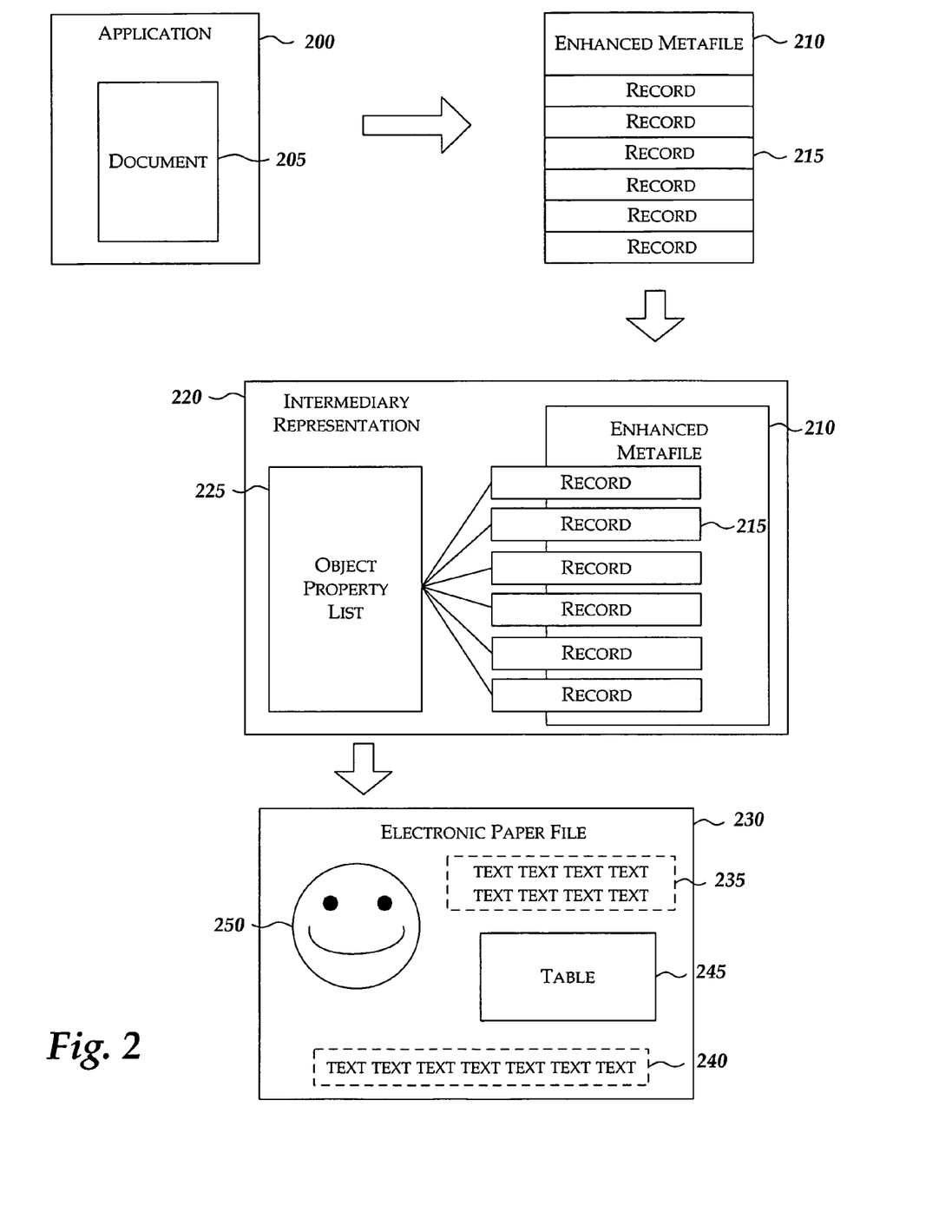
FIG. 2 is a conceptual diagram illustrating major functional blocks involved in generating an electronic paper file from an enhanced metafile.

FIG. 2 is a conceptual diagram illustrating major functional blocks involved in generating an electronic paper file from an enhanced metafile. Application 200 may be any program for generating document 205, such as a word processor application, a spreadsheet application, or a presentation application. Document 205 may include objects such as images, text, and tables. Application 200 generates at least one enhanced metafile associated with document 205, such as enhanced metafile 210, when a user executes a command to publish document 205 to an electronic paper format. Enhanced metafile 210 provides a graphical representation of document 205. Enhanced metafile 210 is a set of instructions on how to draw each of the elements contained in document 205 to a page (e.g., a screenshot of what application 200 draws to a graphic output device). The elements may include shapes, text, tables, images, or any other object type.

Enhanced metafile 210 includes a series of individual records 215 that provide a sequence of graphic instructions to render properties associated with the objects in document 205 in an output format (e.g., a portable document format (PDF) file). For example, a first record may include an instruction to select a pen. A second record may include an instruction to select a pen width. A third record may include an instruction to select a pen color. A fourth record may include an instruction to draw an arc with a specified angle with the currently selected pen from point A to point B. Enhanced metafile 210 is state dependent and strictly structured because many of the records are meaningless when taken out of context of the sequence.

Enhanced metafile 210 is parsed into a series of objects to generate intermediary representation 220 of document 205. Graphic instructions associated with each object are provided with context such that the objects in object property list 225 are state independent. For example, one object in an object storage structure, such as object property list 225, may be associated with instructions for drawing an arc with a certain angle from point A to point B with a specified pen, color and width. Another object in object property list 225 may be associated with instructions for reproducing text with a specified font, size, and formatting. The object also includes the actual characters to reproduce. The objects and corresponding identifying information (e.g., identifier/value pairs) are temporarily stored in object property list 225 before using the objects to generate electronic paper file 230. The objects are identified in object property list 225 by an identifier/value pair. Object property list 225 provides a stateless model of enhanced metafile 210 such that the objects may be applied to any output format.

After enhanced metafile 210 is converted into a stateless model, object property list 225 is used to collect, store and process the relevant data. The objects and the corresponding identifying information are stored in object property list 225. The objects are arranged in object property list 225 in a format that is suitable for generating electronic paper file 230 version of document 205. However, the structure of object property list 225 is flexible allowing for the storage and output of different data types and nested object storage structures such that a complex object hierarchy may be achieved. Thus, data may be converted from multiple applications with different data descriptions to a single electronic paper format having a particular data description.

The structured sequence of records in enhanced metafile 210 is different than the generic listing of objects in object property list 225 to generate electronic paper file 230 for different output formats. The contents of the objects in object property list 225 are identified such that a determination may be made about which data is necessary to generate electronic paper file 230. Any irrelevant data may be discarded. The necessary data is maintained in intermediary form in object property list 225 and retrieved to generate electronic paper file 230 in the corresponding output format. Electronic paper file 230 is created from the objects in object property list 225. For example, text boxes 235, 240, table 245 and image 250 are generated in electronic paper file 230 by accessing the corresponding objects in object property list 225.

Figure 3:
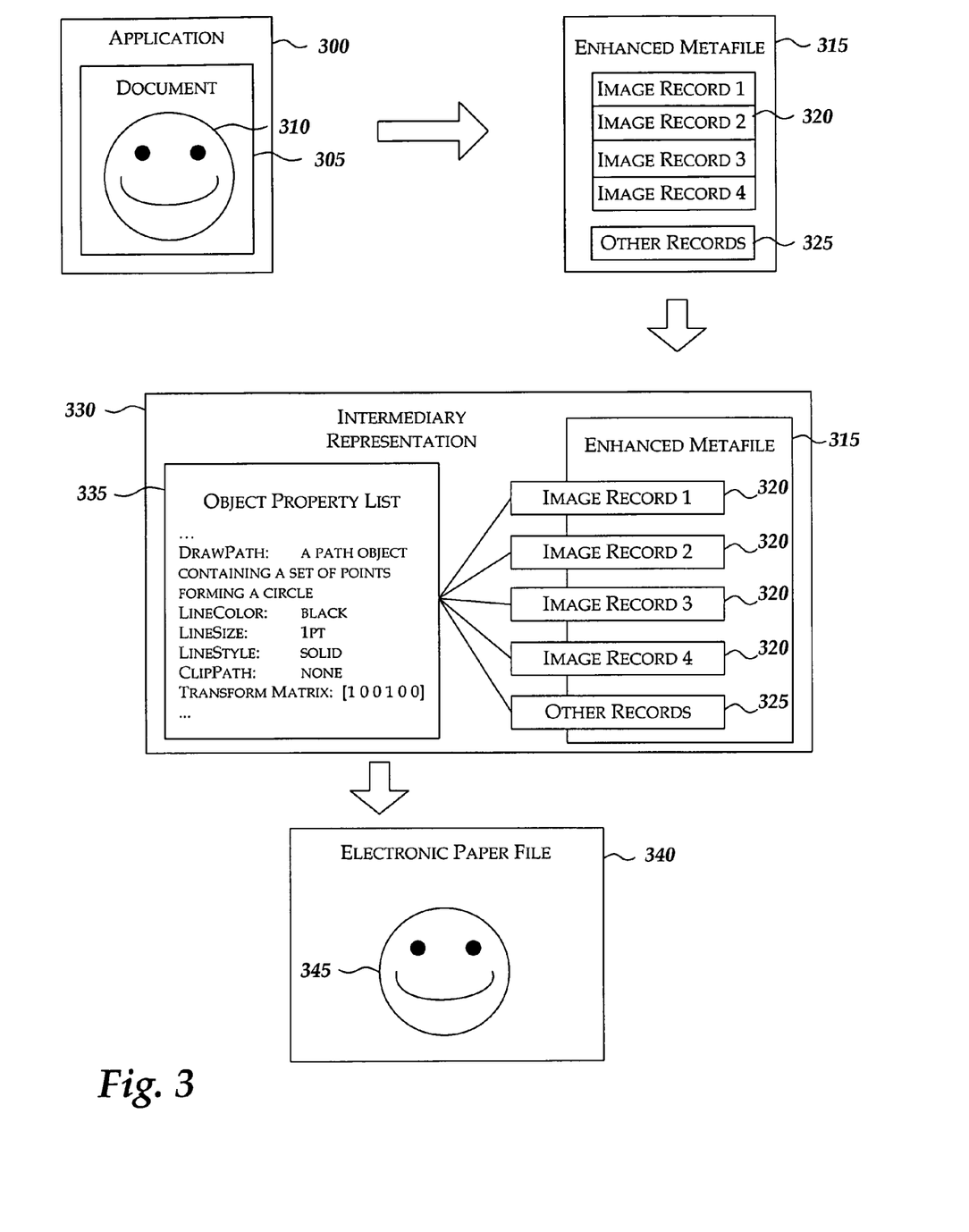
FIG. 3 is a conceptual diagram illustrating major functional blocks involved in generating an electronic paper file from an enhanced metafile.

FIG. 3 is a conceptual diagram illustrating major functional blocks involved in generating an electronic paper file from an enhanced metafile. Application 300 generates document 305. Document 305 includes objects such as image 310. Application 300 generates enhanced metafile 315 when a user executes a command to publish document 305 to an electronic paper format. Enhanced metafile 315 provides a graphical representation of document 305. The graphical representation is expressed as a sequential listing of instructions for recreating document 305 in a different output format. The instructions may be graphically represented by records 320, 325. Specifically, image record 1 may be an instruction to select a pen; image record 2 may be an instruction to select a line width; image record 3 may be an instruction to select a color; and image record 4 may be an instruction to draw a circle with a particular diameter at a specific location using the currently selected pen. Other records 325 may be included to complete the instructions for regenerating document 305.

Enhanced metafile 315 is parsed to generate intermediary representation 330 of document 305 such that records 320, 325 are no longer sequentially dependent on each other. For example, image records 320 may be combined in an object storage structure that is associated with image 310, such as object property list 335. Object property list 335 includes state independent graphical instructions for recreating image 310 as image 345 in electronic paper file 340. Object property list 335 provides instructions for drawing each distinct object included in image 305. For example, one object in object property list 335 may include instructions for drawing a circle with a specified color, line width, line type, diameter and location on a page. Object property list 335 may further include instructions for drawing other objects to complete the graphical representation of image 310. Specifically, the other objects may be associated with: two smaller circles filled in black each having a specific location and diameter; and an arc drawn from point A to point B at a specified angle with a particular pen, width and color. Each object in object property list 335 includes identifying information such as an identifier/value pair. Object property list 335 provides temporary storage for the objects before the objects are used to generate electronic paper file 340.

Electronic paper file 340 is generated by accessing the corresponding objects in object property list 335. For example, to generate image 345 the objects corresponding to image 310 are accessed from object property list 335 and forwarded to the appropriate output format (e.g., a printer, a display, a file, etc.). The objects include all of the instructions necessary to generate image 345 in electronic paper file 340.

Figure 4:
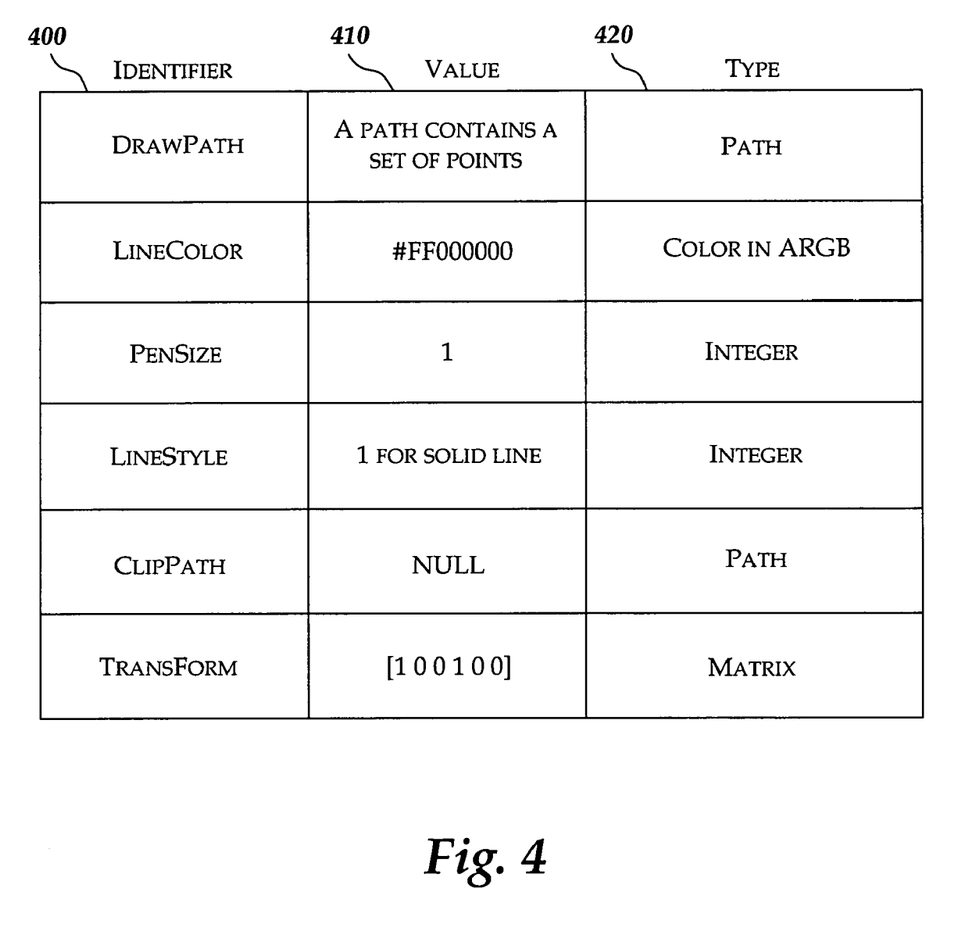
FIG. 4 illustrates an example of an object storage structure.

FIG. 4 illustrates an example of an object storage structure. The object storage structure may be exemplified by an object property list. The object property list is an intermediary store for objects parsed from an enhanced metafile. The objects are used to output a graphical representation of a document in a desired output format. For example, the object property list may be translated into PDF file instructions. The object property list is a data structure that provides a list of records. The example object property list shown in FIG. 4 provides graphical information for objects associated with a circle. Each record in the object property list includes properties for identifier 400, value 410, and type 420 for each object. Examples of different types 420 include Boolean, true/false, integer and string. Objects are organized in the object property list such that memory is efficiently utilized.

The object property list maintains an order of records such that an order of how a graphic is drawn to an output format is retained. When a record is positioned in the object property list, the record remains at the position relative to neighboring records. However, the order of the records is state independent such that data may be randomly accessed from the object property list. Data may also be easily added or modified in the object property list because data for recreating a document is retained in the object property list until the appropriate output format is generated. For example, a page object may be created and an image object may be added in the next record of the object property list. The page object may be modified to reference the image object.

An object property list may have different characteristics depending on the object associated with the object property list. In one example, an object property list for an image may include an image data stream, image size (width, height, length), image format (JPG, raw bit map, etc.), type of compression (if any), and a transparency mask. A transparency mask may reference another image object in a different object property list that has the same properties. In another example, an object property list for a font may include the name of the font, the size, the characters used in the document, and whether the font is embedded.

The objects are maintained in the object property list until the document is converted to an output format. When a page of the document is output, only the objects included on the page are output; other objects that are not included on the page are not output. The contents of the object corresponding to the page of the document are written to an output format (e.g., a data stream sent to a printer). After the object is written the object is discarded from the data stream but a record of the object is retained such that the current location and content of the object may be determined as necessary. The remainder of the objects for the document is then sequentially written to the output. A record of objects written to the document is retained even though some objects may not be stored in memory.

Figure 5:
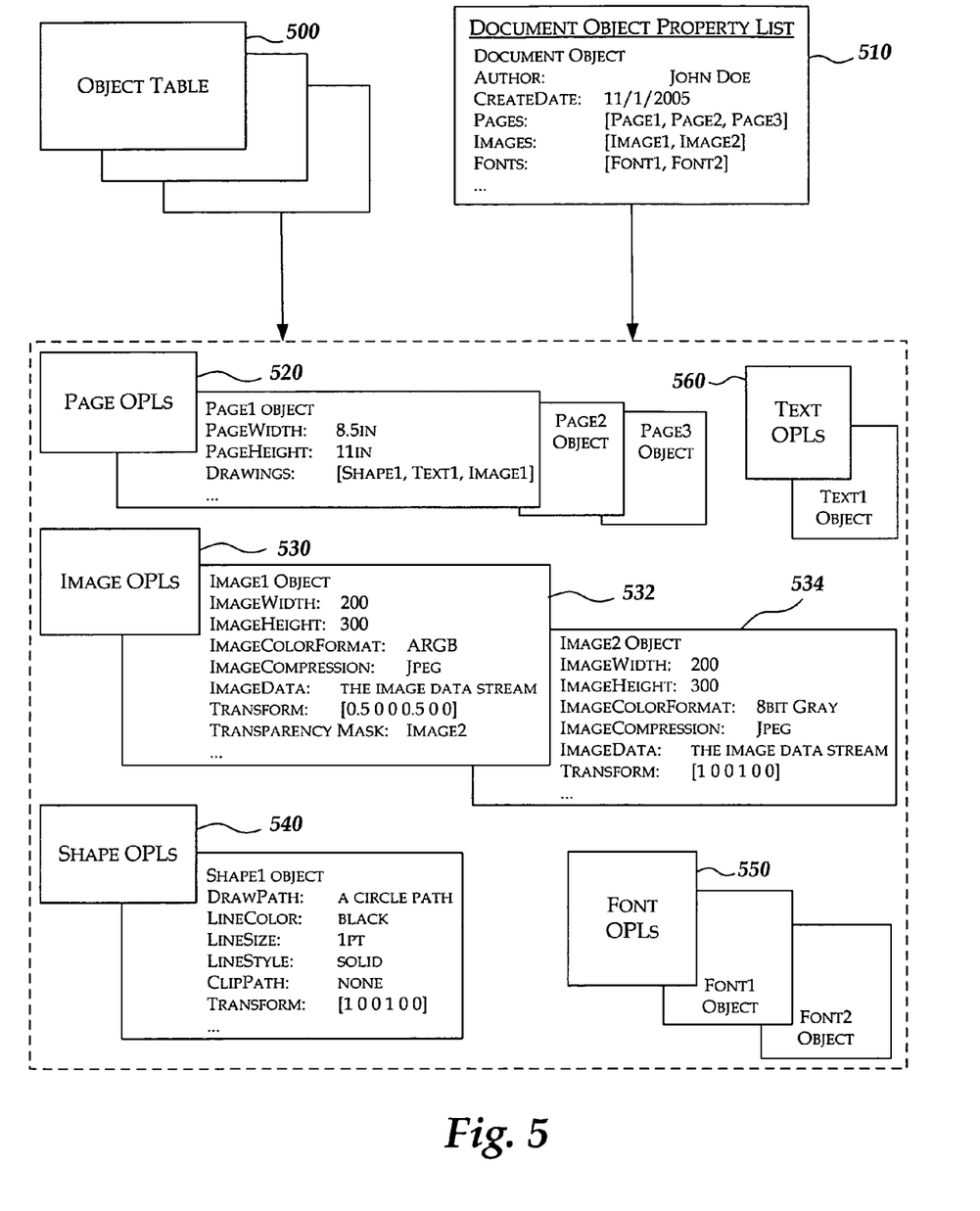
FIG. 5 is a conceptual diagram illustrating multiple object storage structures for generating a graphical representation of a document.

FIG. 5 is a conceptual diagram illustrating multiple object storage structures for generating a graphical representation of a document. Object table 500 is created when a document is generated in an application. Document object property list 510 is an object storage structure for the entire document. A document object representing the entire document is added to object table 500 when the document is created. Object table 500 stores the objects before the objects are assembled in an output format. For example, the document object may be formatted to be emitted as a PDF file. A PDF file is a linear document but the PDF file that is output contains the objects associated with a page of the document that are linked to each other in object table 500.

Object table 500 provides an index of various objects associated with the document. As pages are added to the document, document object property list 510 references corresponding page object storage structures, such as page object property lists 520. The objects corresponding to the added pages are included in object table 500. As graphics are added to a page, the corresponding page object is provided with a stream of graphic instructions to draw the graphical objects on the page.

As external objects become necessary (e.g., images, fonts, shapes, content, text, etc.), the corresponding objects are created and stored in appropriate object storage structures (e.g., image object property lists 530, 532, 534, shape object property lists 540, font object property lists 550, and text object property lists 560). For example, one object in an object storage structure may contain a screen map description of page contents. One object storage structure may describe an element stored within another object storage structure. For example, an object in an object storage structure may correspond to a bit map of an image where the image is a separate object that is included in a different object storage structure. The bit map object is referenced in the object storage structure that includes the image. In another example, image object property list 532 includes a transparency mask property that is defined in image object property list 534. Thus, object table 500 includes a large list of objects that are linked together.

The present disclosure is not limited to the data structures, data types, hierarchies, naming conventions, and the like, discussed above. Other data structures, data types, hierarchies, naming conventions, and the like may be implemented using the principles described herein.

Figure 6:
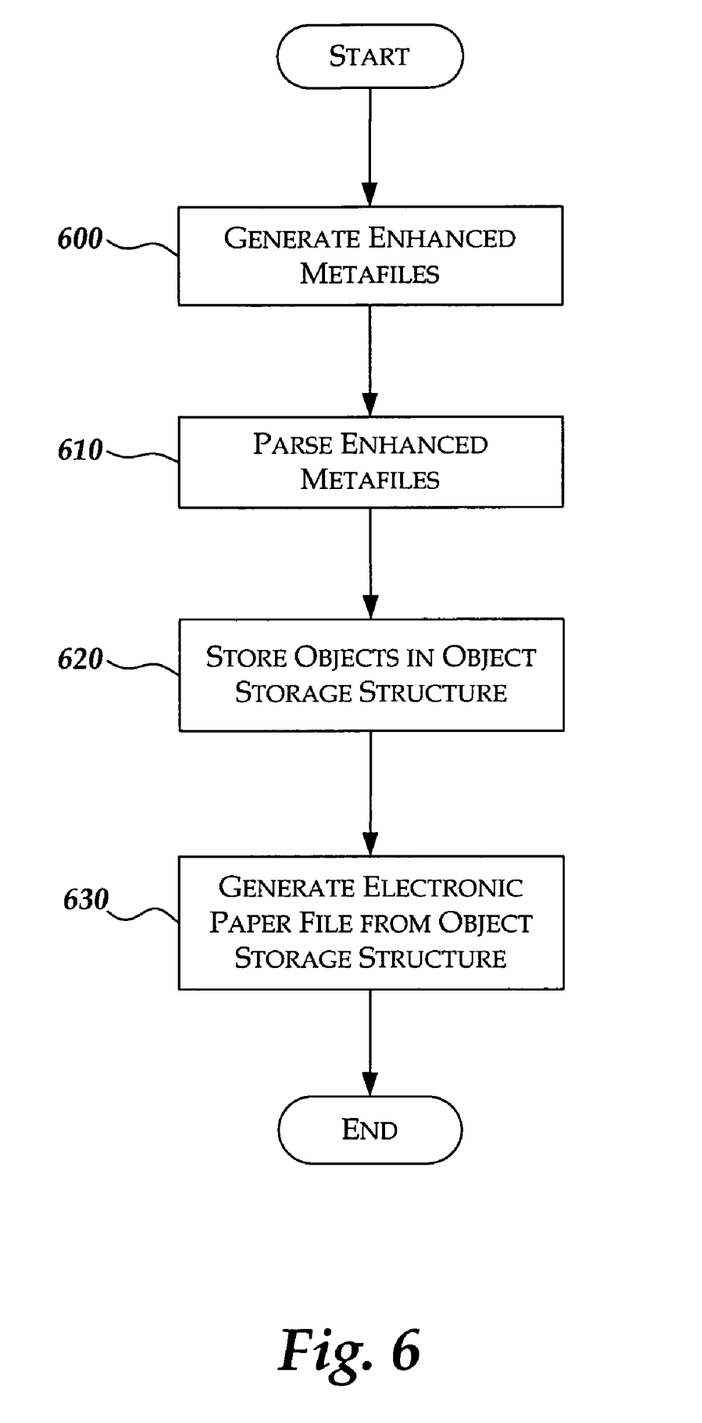
FIG. 6 illustrates a logic flow diagram for a process of generating an electronic paper file from an enhanced metafile.

FIG. 6 illustrates a logic flow diagram for a process of generating an electronic paper file from an enhanced metafile. Processing begins at a start operation where an application generates a document. Objects associated with the document may correspond to the entire document itself, individual pages, page contents such as paragraphs, images, fonts, text, tables, or any other object that may be associated with the document.

At least one enhanced metafile corresponding to the document is generated by the application at operation 600. The enhanced metafiles may be generated when a user executes a command to publish the document to an electronic paper file. The enhanced metafiles provide a graphical representation of the document. The enhanced metafiles include a series of records that provide a sequence of graphic instructions to recreate each of the elements contained in the document in a specified output format (e.g., a PDF file). Each enhanced metafile is state dependent and strictly structured.

Moving to operation 610, the enhanced metafiles are parsed into objects to generate an intermediary representation of the document that is state independent. Objects included in the records of the enhanced metafiles are identified. Graphic instructions associated with each object are provided with context. The stateless model of the enhanced metafile allows the objects to be applied to any output format. The objects are indexed in an object table associated with the object storage structure. The objects associated with a document are linked together in the object table. As objects are added to a document, the objects are also added to the object table. The object table may link an object from one object storage structure to an object in a different object storage structure. Transitioning to operation 620, the objects parsed from the enhanced metafile are temporarily stored in an object storage structure. Each object includes all the graphical instruction necessary to duplicate the object in an electronic paper file. The object storage structure collects, stores and processes the relevant data to generate the corresponding electronic paper file. Each object is arranged in the object storage structure in a format that is suitable for generating the electronic paper file. Each object record in the object storage structure includes identifying information such as an identifier, a value and an object type. The contents of the objects in the object storage structure are identified such that a determination may be made about which data is necessary to generate the electronic paper file in the selected output format. The objects in the object storage structure are state independent such that the objects may be randomly accessed from the object storage structure.

Proceeding to operation 630, an electronic paper file is generated from the object storage structure. Only the objects that are included in the electronic paper file are accessed in the object storage structure to reproduce the document in the appropriate output format. Processing then terminates at an end operation.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computer-implemented method for converting a document into a Portable Document Format (PDF), the computer-implemented method comprising:

obtaining a document that includes a plurality of graphic objects;

receiving an instruction to cause a graphic engine to render the document as a PDF;

in response to receiving the instruction, generating an enhanced metafile (EMF) for the document, wherein the EMF includes a chronologically dependent series of instructions for causing the graphics engine to chronologically render the PDF in a chronologic order mandated by the chronologically dependent series of instructions;

prior to causing the graphic engine to render the document as the PDF:

parsing the EMF to identify respective graphic instructions for each of the graphic objects of the document;

separately grouping the identified respective graphic instructions for each graphic object of the document into an Object Property List (OPL), wherein the respective graphic instructions for each grouping are renderable chronologically independent from any other groupings of the OPL; and causing the graphic engine to render the PDF from the OPL.

2. The computer-implemented method of claim 1, wherein the respective graphic instructions parsed from the EMF are converted to identifier/value pairs upon receiving the respective graphic instructions into the OPL.

3. The computer-implemented method of claim 1, wherein the OPL for each of the graphic objects of the document are temporarily stored prior to the generation of the PDF.

4. The computer-implemented method of claim 1, wherein the OPL includes an identifier field to identify a graphic object of the document, a value field to identify a value of the graphic object, and a type field to identify a type of an acceptable value for the value field.

5. The computer-implemented method of claim 1, wherein the OPL for each of the graphic objects of the document are hierarchically linked together in an object table.

6. A computer-readable storage medium having computer executable instructions for converting a document into a Portable Document Format (PDF), the instructions comprising:

obtaining a document that includes a plurality of graphic objects;

receiving an instruction to cause a graphic engine to render the document as a PDF;

in response to receiving the instruction, generating an enhanced metafile (EMF) for the document, wherein the EMF includes a chronologically dependent series of instructions for causing the graphics engine to chronologically render the PDF in a chronologic order mandated by the chronologically dependent series of instructions;

parsing the EMF to identify respective graphic instructions for each of the graphic objects of the document;

separately grouping the identified respective graphic instructions for each graphic object of the document into an Object Property List (OPL), wherein the respective graphic instructions for each grouping are renderable chronologically independent from any other groupings of the OPL; and causing the graphic engine to render the PDF from the OPL.

7. The computer readable storage medium of claim 6, wherein the respective graphic instructions parsed from the EMF are converted to identifier/value pairs upon receiving the respective graphic instructions into the OPL.

8. The computer readable storage medium of claim 6, wherein the OPL for each of the graphic objects of the document are temporarily stored prior to the generation of the PDF.

9. The computer readable storage medium of claim 6, wherein the OPL includes an identifier field to identify a graphic object of the document, a value field to identify a value of the graphic object, and a type field to identify a type of an acceptable value for the value field.

10. The computer readable storage medium of claim 6, wherein the OPL for each of the graphic objects of the document are hierarchically linked together in an object table.

11. A system for converting a document into a Portable Document Format (PDF), the system comprising:
   a processor; and
   a memory having computer executable instructions stored thereon, wherein the computer executable instructions are configured for:
      obtaining a document that includes a plurality of graphic objects;
      receiving an instruction to cause a graphic engine to render the document as a PDF;
      in response to receiving the instruction, generating an enhanced metafile (EMF) for the document, wherein the EMF includes a chronologically dependent series of instructions for causing the graphics engine to chronologically render the PDF in a chronologic order mandated by the chronologically dependent series of instructions;
      parsing the EMF to identify respective graphic instructions for each of the graphic objects of the document;
      separately grouping the identified respective graphic instructions for each graphic object of the document into an Object Property List (OPL), wherein the respective graphic instructions for each grouping are renderable chronologically independent from any other groupings of the OPL; and
      causing the graphic engine to render the PDF from the OPL.

12. The system of claim 11, wherein the respective graphic instructions parsed from the EMF are converted to identifier/value pairs upon receiving the respective graphic instructions into the OPL.

13. The system of claim 11, wherein the OPL for each of the graphic objects of the document are temporarily stored prior to the generation of the PDF.

14. The system of claim 11, wherein the OPL includes an identifier field to identify a graphic object of the document, a value field to identify a value of the graphic object, and a type field to identify a type of an acceptable value for the value field.

* * * * *